US012292806B2

(12) United States Patent
Critchley et al.

(10) Patent No.: US 12,292,806 B2
(45) Date of Patent: May 6, 2025

(54) TESTING DRIVES IN A REDUNDANT ARRAY OF INDEPENDENT DISKS (RAID)

(71) Applicant: INTERNATIONAL BUSINESS MACHINES CORPORATION, Armonk, NY (US)

(72) Inventors: Daniel S. Critchley, Winchester (GB); Roderick Guy Charles Moore, Bournemouth (GB); Tim McCarthy, Eastleigh (GB); Jonathan William Lewis Short, Eastleigh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 75 days.

(21) Appl. No.: 18/166,573

(22) Filed: Feb. 9, 2023

(65) Prior Publication Data

US 2024/0273000 A1 Aug. 15, 2024

(51) Int. Cl.
  *G06F 11/00* (2006.01)
  *G06F 11/10* (2006.01)
  *G06F 11/263* (2006.01)

(52) U.S. Cl.
  CPC ...... *G06F 11/2635* (2013.01); *G06F 11/1076* (2013.01); *G06F 2201/81* (2013.01)

(58) Field of Classification Search
  None
  See application file for complete search history.

(56) References Cited

U.S. PATENT DOCUMENTS

| | | | |
|---|---|---|---|
| 6,438,714 B1* | 8/2002 | Canestaro | G06F 11/2221 711/112 |
| 7,587,626 B2 | 9/2009 | Terry | |
| 8,185,784 B2 | 5/2012 | Mccombs | |
| 9,519,545 B2 | 12/2016 | Niewczas | |
| 9,542,296 B1* | 1/2017 | Engers | G06F 11/008 |
| 10,185,639 B1 | 1/2019 | Chatterjee | |
| 10,360,116 B2 | 7/2019 | Myers | |
| 10,365,836 B1* | 7/2019 | Xu | G06F 3/0689 |
| 10,402,104 B2 | 9/2019 | Yang | |
| 2003/0093721 A1 | 5/2003 | King | |
| 2005/0283655 A1* | 12/2005 | Ashmore | G06F 11/1092 714/6.32 |

(Continued)

OTHER PUBLICATIONS

Disclosed Anonymously, "Use of Good Mirror for Background Rebuilding on RAID10 Array", An IP.com Prior Art Database Technical Disclosure, IP.com No. IPCOM000253819D, May 8, 2018, 4 pgs.

*Primary Examiner* — Mujtaba M Chaudry
(74) *Attorney, Agent, or Firm* — Zilka-Kotab, P.C.

(57) ABSTRACT

A method, computer program product, and computer system are provided for testing drives in a redundant array of independent disks (RAID) array. The method includes: mirroring data from a selected drive to be tested in a RAID array to spare storage space in the RAID array; and, once the data is successfully mirrored, testing the selected drive to identify a preemptive failure of the selected drive. The RAID may be a traditional RAID (TRAID) array and the spare space may be a spare physical drive independent of array drive members. The RAID array may alternatively be a distributed RAID (DRAID) array and the spare space may be spare capacity spread through the array drive members.

18 Claims, 7 Drawing Sheets

(56) References Cited

U.S. PATENT DOCUMENTS

| | | | | |
|---|---|---|---|---|
| 2009/0327603 A1* | 12/2009 | McKean | ............... | G06F 3/0617 |
| | | | | 711/E12.001 |
| 2013/0283289 A1* | 10/2013 | Adinarayan | .......... | G06F 9/5094 |
| | | | | 718/105 |
| 2017/0147436 A1* | 5/2017 | Borlick | .................. | G11C 29/40 |
| 2017/0147437 A1* | 5/2017 | Borlick | .............. | G06F 11/1088 |
| 2017/0255238 A1* | 9/2017 | Nakada | ................. | G06F 3/0605 |
| 2021/0342205 A1* | 11/2021 | Mcguinness | .......... | G06F 3/0616 |
| 2022/0338328 A1* | 10/2022 | Mohan | ................... | H05B 47/14 |

* cited by examiner

| D1 301 | D2 302 | D3 303 | D4 304 | D5 305 | D6 306 | D7 307 | S 308 |

FIG. 3A

| D1 301 | D2 302 | D3 303 | D4 304 | D5 305 | D6 306 | D7 307 | S/D1 309 |

MIRROR DATA 320

FIG. 3B

| S' 310 | D2 302 | D3 303 | D4 304 | D5 305 | D6 306 | D7 307 | D1 309 |

FIG. 3C

| D2/S' 311 | D2 302 | D3 303 | D4 304 | D5 305 | D6 306 | D7 307 | D1 309 |

MIRROR DATA 321

FIG. 3D

| D2 311 | S" 312 | D3 303 | D4 304 | D5 305 | D6 306 | D7 307 | D1 309 |

FIG. 3E

| D1 401 | D2 402 | D3 403 | D4 404 | D5 405 | D6 406 | D7 407 | D8 408 |

| D1 401 | D2 402 | D3 403 | D4 404 | D5 405 | D6 406 | D7 407 | D8 408 |

| X 411 | D2 402 | D3 403 | D4 404 | D5 405 | D6 406 | D7 407 | D8 408 |

TESTING DRIVES IN A REDUNDANT ARRAY OF INDEPENDENT DISKS (RAID)

BACKGROUND

The present invention relates to storage systems in the form of redundant arrays of independent disks (RAID), and more specifically, to testing drives in RAID arrays.

When a drive is powered down and powered back up, there is an increased likelihood of that drive failing. The drive itself may go through enhanced power on self-test that finds issues that would not normally be detected at runtime.

This failure becomes more likely as the drives get older. If a user experiences a power loss event of the entire storage subsystem, then it is possible that one or more drives may fail when power is restored. If this affects multiple drives in the same array then data loss may occur. The failure of multiple arrays becomes even more likely when the drives in a system come from the same batch and so have a similar mean time till failure. Further challenges exist in a RAID environment where a drive loss leads to reduced redundancy for the array.

A number of known efforts are made to test a drive by powering it off and on again. However, these are aimed at a product development environment and are used to validate that a new drive works as expected.

Existing RAID algorithms will survive single or multiple drive failures by being able to rebuild data from a missing drive using parity. Spare array capacity is used to "reconstruct" the data to replace the missing drive. Temporary loss of access to a drive can also be ridden through using technology such as component in doubt. The existing technologies work to recover from a drive once it is failed and do nothing to pre-empt a failure and attempt to maintain redundancy.

SUMMARY

According to one aspect of the present invention there is a method, computer program product and/or computer system for use with a RAID array device including a plurality of disk drives for performing the following operations: (i) selecting a selected disk drive, from the plurality of disk drives, for preemptive testing; (ii) performing a preemptive failure test on the selected disk drive to force a preemptive failure that exposes a latent problem with the disk drive; and (iii) replacing the selected drive in the RAID array device with a repaired version of the selected disk drive or a replacement disk drive.

According to an embodiment of the present invention there is provided a computer-implemented method for testing drives in a redundant array of independent disks (RAID) array, the method comprising: mirroring data from a selected drive to be tested in a RAID array to spare storage space in the RAID array; and, once the data is successfully mirrored, testing the selected drive to identify a preemptive failure of the selected drive.

According to another embodiment of the present invention there is provided a system for testing drives in a redundant array of independent disks (RAID) array, comprising: a processor and a memory configured to provide computer program instructions to the processor to execute the function of the components: a mirroring component for mirroring data from a selected drive to be tested in a RAID array to spare storage space in the RAID array; and a drive testing component for, once the data is successfully mirrored, testing the selected drive to identify a preemptive failure of the selected drive.

According to a further embodiment of the present invention there is provided a computer program product for testing drives in a redundant array of independent disks (RAID) array, the computer program product comprising a computer readable storage medium having program instructions embodied therewith, the program instructions executable by a processor to cause the processor to: mirror data from a selected drive to be tested in a RAID array to spare storage space in the RAID array; and, once the data is successfully mirrored, test the selected drive to identify a preemptive failure of the selected drive.

The computer readable storage medium may be a non-transitory computer readable storage medium, and the computer readable program code may be executable by a processing circuit.

BRIEF DESCRIPTION OF THE DRAWINGS

Embodiments of the present invention will now be described, by way of example only, with reference to the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product are provided for testing drives in a redundant array of independent disks (RAID) array. The RAID array may be a traditional RAID (TRAID) array in which a spare physical drive is provided, a distributed RAID (DRAID) in which spare capacity is distributed through the drives of the array, or any other type of RAID array now known or to be developed in the future.

The method mirrors data from a selected drive to be tested in the RAID array to spare storage space in the RAID array, either the spare storage drive in TRAID or the distributed spare capacity in DRAID. Once the data is successfully mirrored, the selected drive is tested to identify a preemptive failure of the selected drive. The method cycles through the drives in the RAID array to test all the drives individually to preempt drive failure.

The testing of drives in a RAID array is an improvement in the technical field of computer storage systems and more particularly in the technical field of RAID storage systems.

The testing may be, for example, a powering off and back on. The method may be used for dynamically identifying a drive failure in a RAID environment after a controlled power loss of a selected drive. The method may execute a power cycle of a drive non-disruptively in a production system. In other embodiments, other forms of testing may be performed.

By allowing for testing, including drive power cycling, without reducing redundancy capability, drives can be tested periodically to improve overall system resilience to power loss scenarios.

Figure 1:
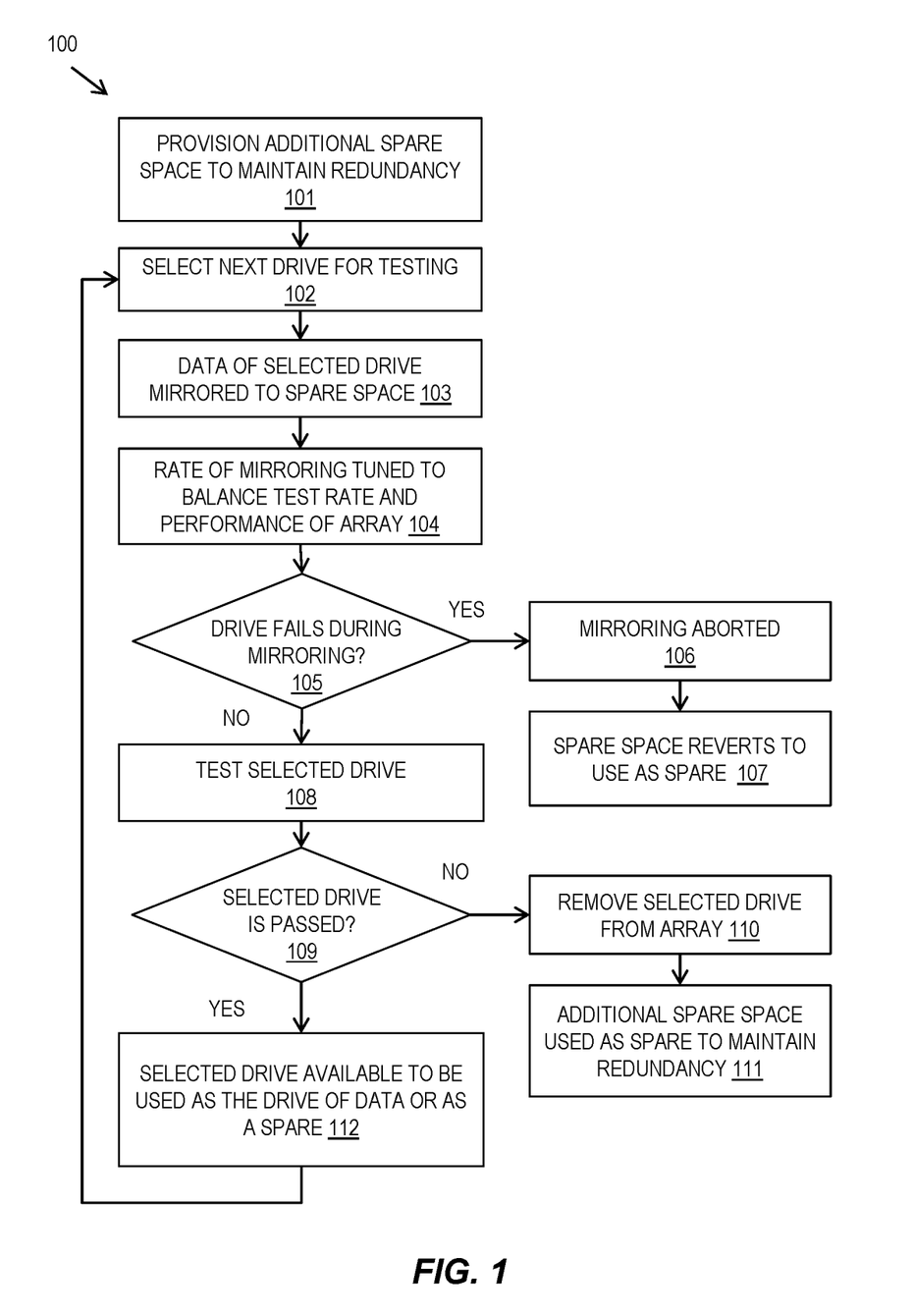
FIG. 1 is a flow diagram of an example embodiment of a method in accordance with embodiments of the present invention.

Referring to FIG. 1, a flow diagram 100 shows an example embodiment of the described computer-implemented method for testing drives in a redundant array of independent disks (RAID) array. The method of FIG. 1 may be carried out for a TRAID array or a DRAID array.

The method may provision 101 sufficient spare space to maintain redundancy in the RAID array during the mirroring and testing. This additional drive provisioning allows for a removal of a selected drive from the RAID array if it fails the testing. Alternatively, the method may be carried out without additional provisioning with additional spare space provisioned if a drive fails during testing. No data will be lost in either scenario.

The method may select 102 a drive in the RAID array for testing. This may be done on a rotational basis with each drive in the array being tested.

The method may mirror 103 data from the selected drive to be tested to spare storage space in the RAID array. As described in relation to FIG. 2A and FIG. 2B, in a TRAID array, the spare storage space may be a spare physical drive and, in the DRAID array, the spare storage space may be storage capacity distributed in areas across the DRAID array.

A rate of mirroring may be tuned 104 to balance a desired test rate of a drive and an impact of the mirroring on performance of the RAID array.

It may be determined 105 whether any drive of the array (either the drive selected for the test or any other drive) fails during mirroring. If so, the mirroring is aborted 106 and the spare storage space reverts 107 to a normal spare space for the RAID array. Additional spare space may be provisioned before the testing continues.

Once the data is successfully mirrored, the method may test 108 the selected drive to identify a preemptive failure of the selected drive. The testing may be power cycling of the drive by powering the selected drive off and on again for preemptive detection of drives that fail after power loss.

It may be determined 109 if the tested selected drive passes the test. If it does not pass, the selected drive may be removed 110 from the RAID array. If there is additional spare space provisioned, this may be used 111 as spare space to maintain redundancy.

If the tested selected drive passes, the selected drive is available 112 to be used either for its data with the spare space to which the data was mirrored freed up, or as a new spare. These options are described further in relation to the methods described in FIGS. 2A and 2B.

The method may repeat to select 102 a next drive for testing and this may be repeated for each drive in a RAID array.

The method has the advantage that spare scrubbing capabilities that would usually test that any spare drives or capacity are working and suitable for use is not required. The testing method removes the need for the spare scrub as it is scrubbing all spare space by default.

In arrays in which there is additional spare space provisioned such that there is excess capacity once a drive's data is mirrored, the method may cycle through the spare space as the recipient of the mirroring data to ensure the spare space is used equally.

The described method provides a mirroring of a drive that is under test before it is tested. This mirror of the drive maintains redundancy of the array even with the loss of a drive induced by the testing.

Figure 2A:
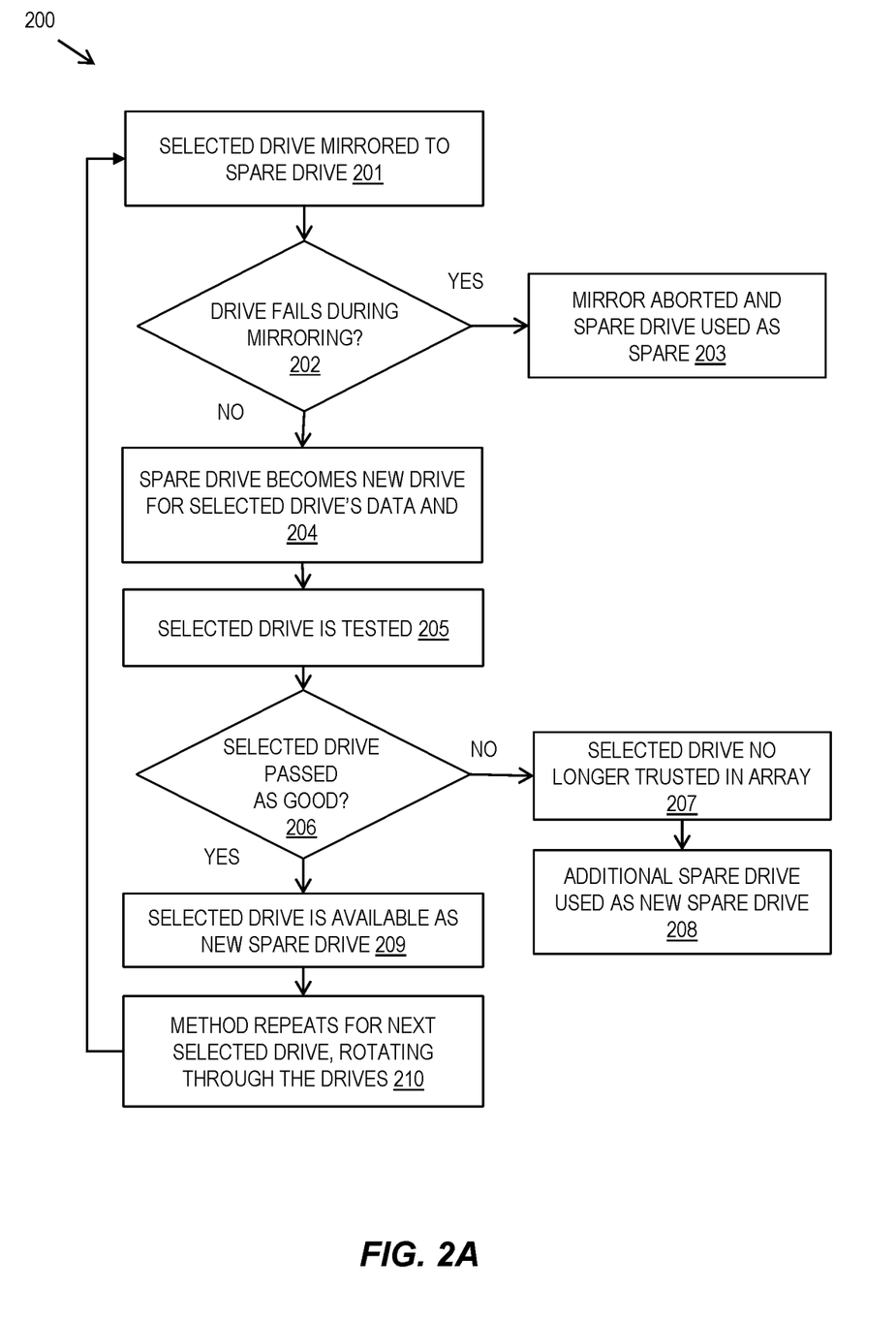
FIG. 2A is a flow diagram of the example embodiment of FIG. 1 for a traditional RAID array in accordance with embodiments of the present invention.

Referring to FIG. 2A, a flow diagram 200 shows an example embodiment of the described method carried out in a traditional RAID (TRAID) array in which the spare space is a spare physical drive independent of array drive members. Redundancy may be maintained in the TRAID array by adding an extra spare drive during the mirroring and testing.

The method may mirror 201 data from a selected drive to the spare physical drive. It may be determined 202 whether any drive of the array experiences a failure condition during mirroring. If so, the mirroring aborts 203 and the spare drive is used as the spare.

If the mirroring does not fail, the spare drive with the mirrored data of the selected drive becomes 204 the new drive for the selected drive's data. The selected drive is tested 205, for example, by power cycling.

It is determined 206 if the selected drive passes the testing. If it fails, the selected drive is no longer trusted 207 in the TRAID array. Any additional spare drive is used 208 as the new spare drive.

If the selected drive passes the testing, the data of the selected drive is kept on the previous spare drive and the selected drive becomes available 209 as the new spare drive to which data of a next selected drive is mirrored. The method repeats 210 for a next selected drive, rotating through the drives in the TRAID array.

In TRAID arrays, data is mirrored from a good drive to allow that drive to be tested as a spare to ensure the drive will survive the testing.

Figure 2B:
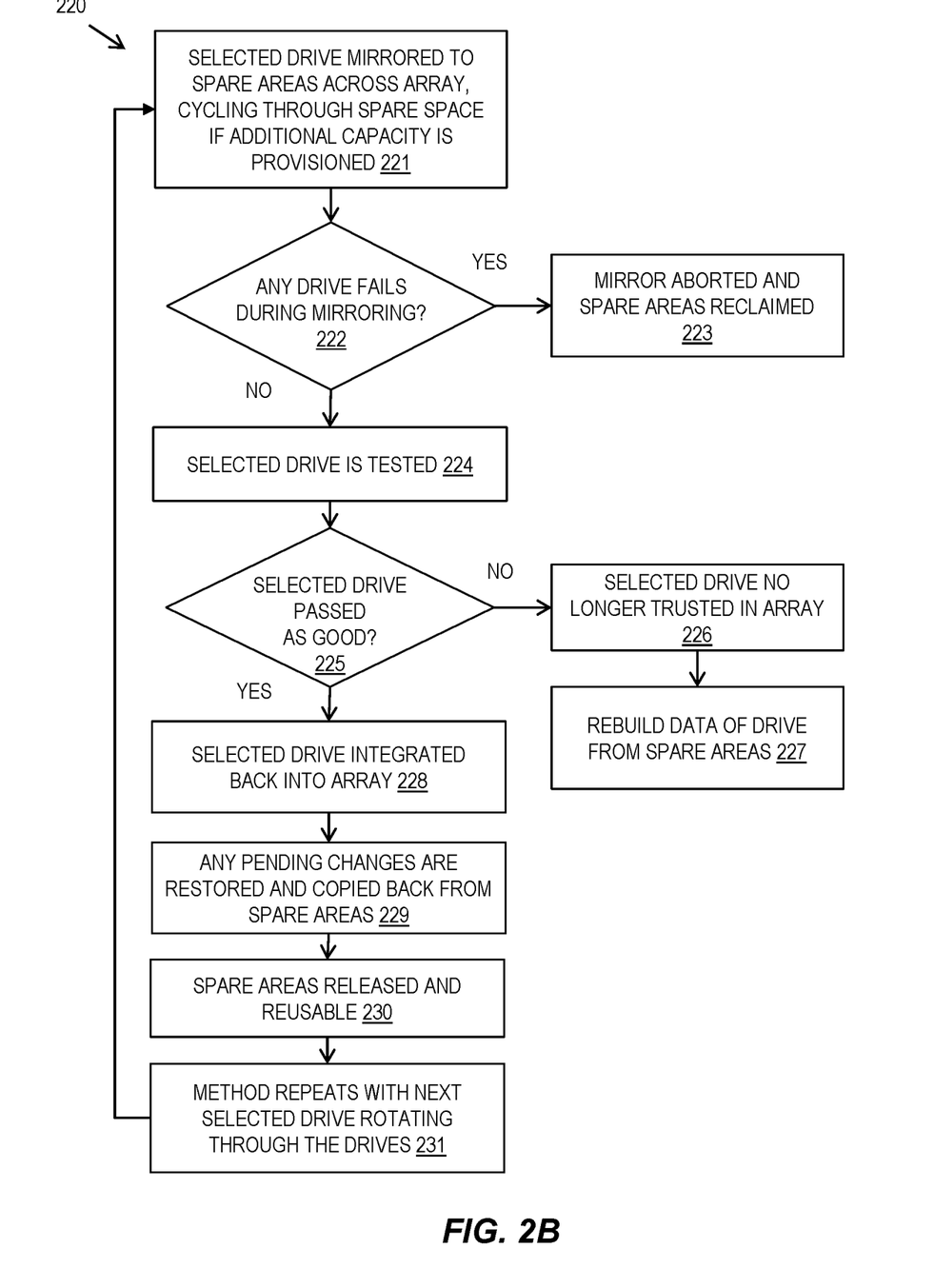
FIG. 2B is a flow diagram of the example embodiment of FIG. 1 for a distributed RAID array in accordance with embodiments of the present invention.

Referring to FIG. 2B, a flow diagram 220 shows an example embodiment of the described method carried out in a distributed RAID (DRAID) array in which the spare space is spare capacity distributed through the array drive members. Redundancy may be maintained in the DRAID array by adding extra drive capacity worth an extra spare drive's space spread through the array drive members during the mirroring and testing.

A selected drive may have its data mirrored 221 to spare area across the DRAID array. If there is more spare space provisioned than a single drive's worth of data, the method may cycle through the spare space.

It may be determined 222 if the selected drive (or any other drive in the array) fails during mirroring. If so, the mirroring of the data is aborted 223 and the spare areas reclaimed. Similarly, if any of the drives involved in the mirroring fails, then the process is aborted until the drive is replaced.

If the mirroring is successful, the selected drive is then tested 224. It is determined 225 if the selected drive passes its testing. If it does not pass, the selected drive is no longer trusted 226 in the array. The mirrored data is rebuilt 227 to a new drive from the spare areas.

If the selected drive passes the testing, the selected drive is integrated 228 back into the DRAID array. Any pending changes are restored 229 and copied back from the spare areas. The spare areas are released 230 and are reusable. The method repeats 231 with a next selected drive, rotating through the drives in the DRAID array.

In DRAID arrays, rebuild bottlenecks that may occur in non-distributed array configurations are solved because rebuild areas are distributed across all the drives in the array. Data can be copied faster to the rebuild area and redundancy is restored much more rapidly.

Figure 3A:
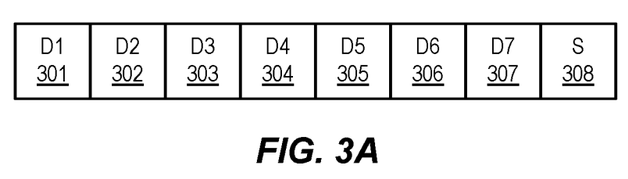
FIGS. 3A to 3E are schematic diagrams illustrating an example embodiment of the method for a traditional RAID array in accordance with embodiments of the present invention.

Referring to FIGS. 3A to 3E, a series of schematic diagrams show the method as carried out at a TRAID array. The TRAID array is shown in FIG. 3A is a TRAID 5-N data disks and available spare with 7 drives, D1-D7 301-307 and a hot spare drive S 308. In the case of TRAID, the "spare space" is provided by a physical drive S 308 independent of the array members D1-D7 301-307.

The recommendation is to provision sufficient spare capacity for the array such that there is no diminishing of redundancy capability as a result of using this method. In a TRAID spare pool, this would mean adding 1 extra drive than would otherwise have been used in the pool.

Figure 3B:
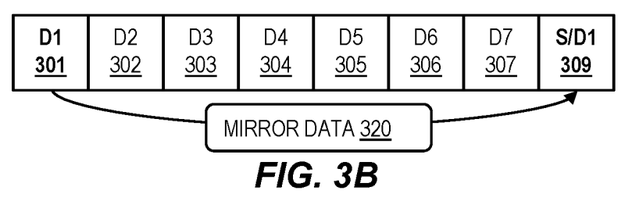

FIG. 3B shows that the data of D1 301 mirrored 320 to a spare drive S 308 to result in drive S/D1 309 containing D1's mirrored data. During the mirroring process if any drive was to fail during the mirroring process, the mirror is aborted, S/D1 309 reverts to a normal spare drive S 308 and is taken into the array as normal. The rate of the mirroring process may be tuned to balance both the desired test rate of the drive and the impact of the mirroring process on the performance of the system.

Figure 3C:
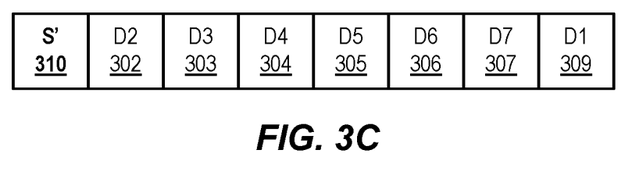

FIG. 3C shows that once mirroring is complete, S/D1 309 is exchanged into the array in place of the original D1 301, and the original D1 301 is removed and becomes a spare S' 310. S' 310 (formally D1) is then power cycled. After the power cycle, the drive S' 310 is either passed good and available to be used again as a spare drive, or failed and no longer trusted to be part of the array. The overall redundancy of the array is, however, not compromised during the failure.

The overall system redundancy can be configured to have sufficient spares in the system to allow for this testing to detect failure of spare drives without removing all spare capacity from the system. The testing should only be run when there is further spare capacity available should the drive under test fail.

Figure 3D:
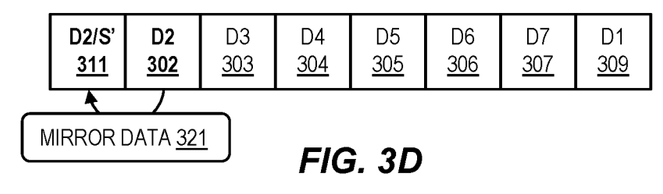
Figure 3E:
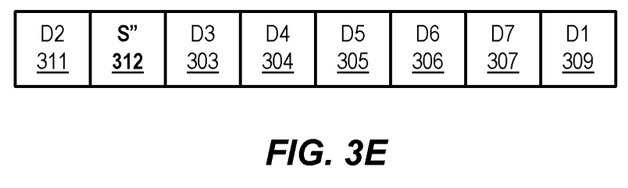

FIG. 3D shows that the process is now repeated for the next drive D2 302 that is mirrored 321 to the spare S' 310 to become S'/D2 311. FIG. 3E shows the drive S'/D2 311 becomes new D2 311 and previous D2 302 becomes the new spare S" 312 that is power cycled. The process gradually power cycles each drive one by one with no loss of redundancy.

Existing TRAID algorithms also include spare scrubbing capabilities that would usually test that any spare drives are working and suitable for use, the described added power cycle test removes the need for the spare scrub as it is scrubbing all spares by default.

Figure 4A:
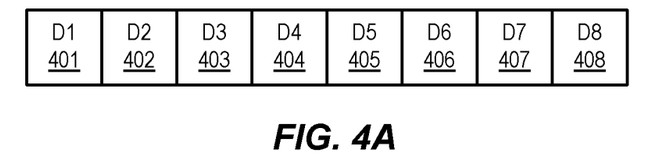
FIGS. 4A to 4E are schematic diagrams illustrating an example embodiment of the method for a distributed RAID array in accordance with embodiments of the present invention.

Referring to FIGS. 4A to 4E, a series of schematic diagrams show the method as carried out at a DRAID array. The DRAID array is shown in FIG. 4A is an 8 member DRAID array (D1-D8). In the case of DRAID, the "spare space" is provided by spare capacity spread throughout the array members D1-D8 401-408. In DRAID, sufficient spare capacity is provisioned to allow for 1 drives worth of additional capacity.

Figure 4B:
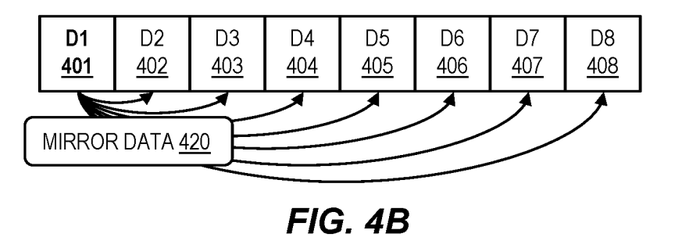

FIG. 4B shows that the contents of D1 401 is mirrored 420 to spare areas spread around the distributed array 401-408. If any drive was to fail during the mirroring process, the mirror is aborted, spare area is reclaimed, and is used by the array as normal.

Figure 4C:
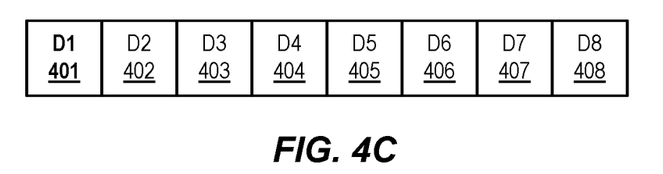

FIG. 4C shows that, once mirroring is complete, D1 401 is power cycled, but not removed from the array.

Figure 4D:
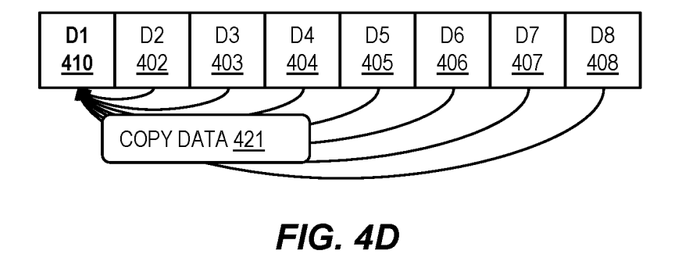

FIG. 4D shows that, if the drive D1 401 returns from the power cycle, it is integrated back into the array as D1 410 with any pending changes restored and copied 421 back from the spare capacity used during the testing of the drive, then the spare capacity is released and reusable.

Figure 4E:
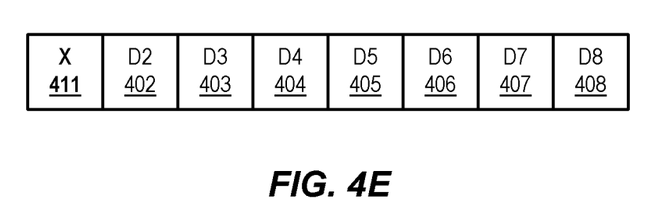

FIG. 4E shows that, if the drive X 411 does not return after the power cycle, it is removed from the array; however, no redundancy is lost as its data is already available in the spare areas.

The process is repeated for the next drive. This method has the benefit of only needing small amounts of data to be resynced after the power cycle. It also maintains a distribution of load and wear level across all members of the array.

During a single iteration of the process, it is possible that not all of the spare capacity will be utilized. By cycling through the spare capacity for each iteration of the process, eventually all spare capacity will be touched by the process. This can provide an alternative to a traditional spare capacity scrub algorithm and reduces the overall performance impact of implementing this process.

Figure 5:
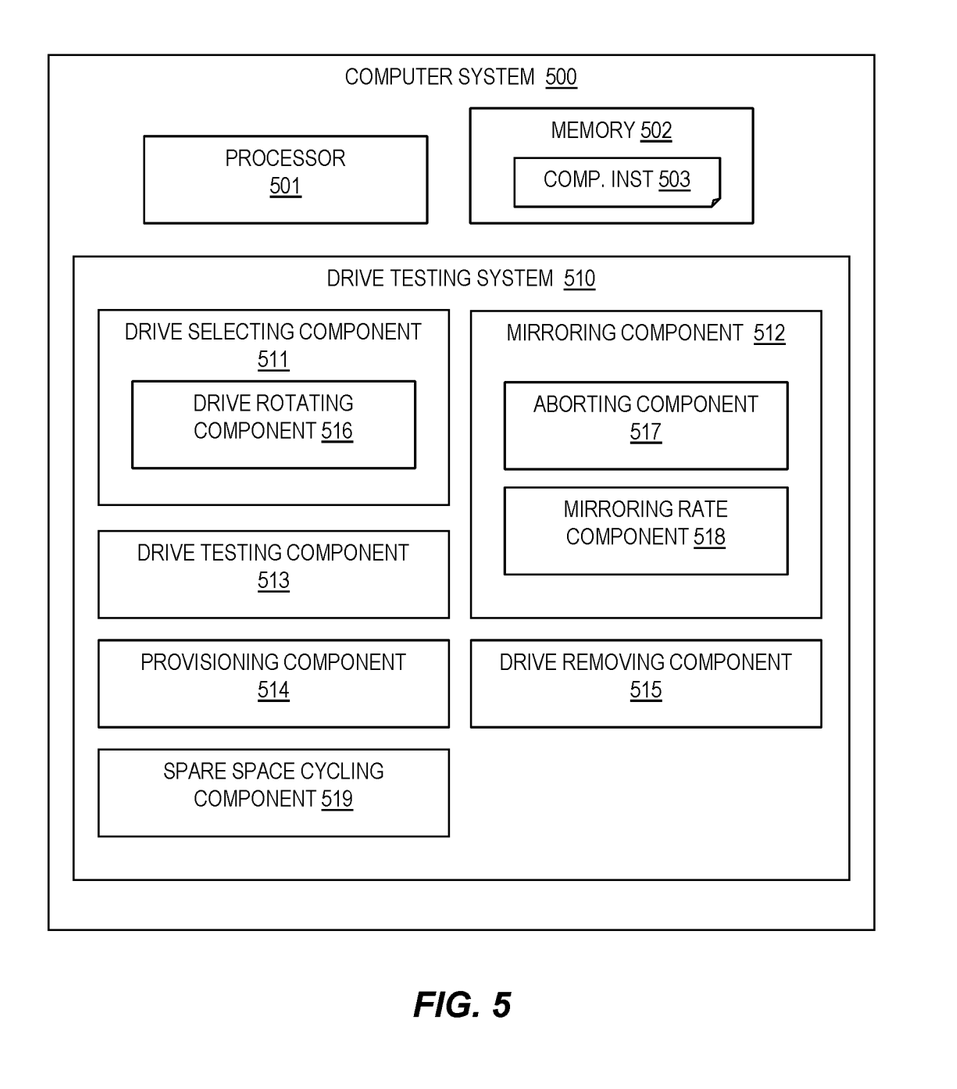
FIG. 5 is block diagram of an example embodiment of a system in accordance with embodiments of the present invention.

Referring to FIG. 5, a block diagram shows an example embodiment of a computer system 500 at which the described drive testing system 510 may be provided. The computer system 500 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The drive testing system 510 may include a drive selecting component 511 for selecting a drive in a RAID array to be tested. The drive selecting component 511 may include a drive rotating component 516 for repeating the method for each drive in a RAID array.

The drive testing system 510 may include a mirroring component 512 for mirroring data from a selected drive to spare storage space in the RAID array. The mirroring component 512 may include an aborting component 517 for, if the selected drive (or any other drive in the array) fails during mirroring, aborting the mirroring. The mirroring component 512 may include a mirroring rate component 518 for tuning a rate of mirroring to balance a desired test rate of a drive and an impact of the mirroring on performance of the RAID array.

The drive testing system 510 may include a drive testing component 513 for, once the data is successfully mirrored, testing the selected drive to identify a preemptive failure of the selected drive. The testing may be power cycling by powering the selected drive off and on again for preemptive detection of drives that fail after power loss.

The drive testing system 510 may include a provisioning component 514 for provisioning sufficient spare space to maintain redundancy during the mirroring and testing.

The drive testing system 510 may include a drive removing component 515 for removing a selected drive from the RAID array if it fails during mirroring or testing.

The drive testing system 510 may include a spare space cycling component 519 for, wherein when there is additional spare space, cycling through the spare space as the recipient of the mirroring data.

"Pre-emptive failure testing" is hereby defined for purposes of this document as an attempt to force a failure to materialize that may lay dormant and not noticed in a normal operation (for example, something that is only detected by booting the disk drive with a power cycle). In this document, "pre-emptive failure" refers to pre-emptive testing or a failure induced by preemptive testing (as context may dictate). Detection of a pre-emptive failure by pre-emptive failure testing may be referred to as "pre-emptive detection."

One specific type of pre-emptive testing that can be performed on a RAID array device is referred to in this document as "power cycling preemptive failure testing." It is not unknown for the disk drives of a RAID array device to function properly if they are on and kept on. But they would fail to boot if they were power cycled due to various latent problems, such as faulty capacitor, dead circuit only used on power on or boot self test finding errors. This pre-emptive failure is attempting to force a drive though a power cycle to give confidence that it would pass under some external failure scenario (site power loss). Some embodiments perform power cycling preemptive testing to pre-emptively find drives that would fail when they are switched off and back on so that the latent problem occurs and the faulty drive(s) can be fixed or replaced. RAID can cope with drive failure (1 or 2 depending on raid type being used), but if multiple drives fail at once or fail to boot after a site wide power event then the array can be lost. Various embodiments of the present invention therefore may give confidence in the drives surviving such an event by testing the drives rigorously. Power cycling preemptive failure testing provides a way to periodically check drives can power cycle successfully, such that confidence can be given in them recovering after a site power loss or power event that could impact all devices in the system at once.

Besides power cycling preemptive failure testing, there are other types of preemptive failure testing that may be performed on RAID array devices with multiple disk drives. These other types of preemptive failure testing could be run while the drive is in some predetermined operation state that is purposely induced for the purpose of trying to force a preemptive failure so that it is detected in a testing environment and not during normal operations of the RAID array device.

Preemptive failure testing on RAID array devices typically detects hardware errors, but software errors may also be detected. One goal of power cycling preemptive failure testing is to find any issues that would stop the devices from recovery of a system wide power loss as if more than one device fails to boot successfully then this impacts the RAID data redundancy. Software errors may be recoverable by subsequent reboots (may be after human intervention) but could still cause an outage. Hardware errors are typically more likely to be terminal and unrecovered.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
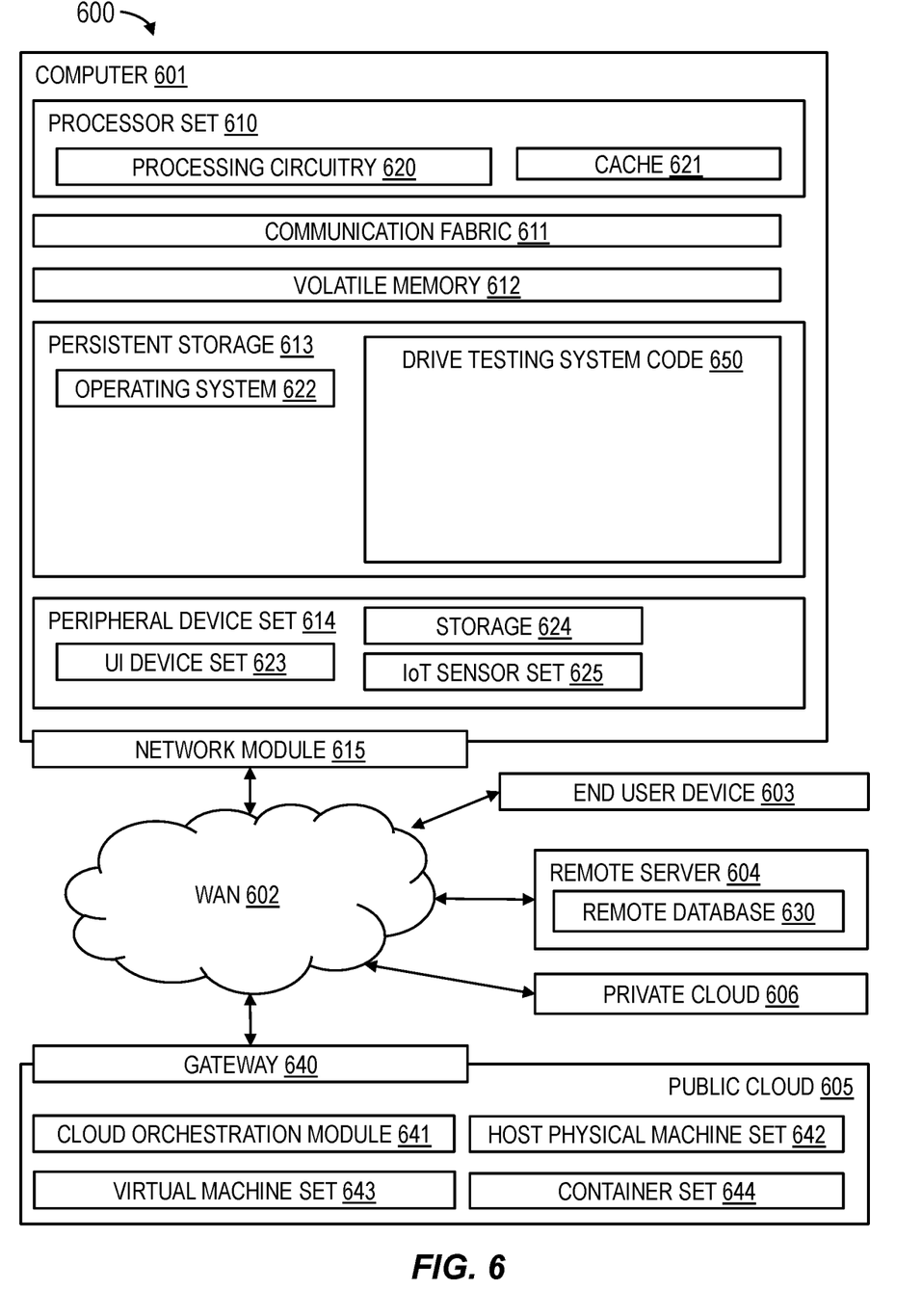
FIG. 6 is a block diagram of an example embodiment of a computing environment for the execution of at least some of the computer code involved in performing the present invention.

Referring to FIG. 6, computing environment 600 contains an example of an environment for the execution of at least some of the computer code involved in performing the inventive methods, such as drive testing system code 650. In addition to block 650, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 650, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 650 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 650 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for testing drives in a redundant array of independent disks (RAID) array, the method comprising:
   mirroring data from a selected drive to be tested in a RAID array, to spare storage space in the RAID array; and
   once the data is successfully mirrored, performing preemptive failure testing on the selected drive to identify a preemptive failure of the selected drive, by:
      causing the selected drive to enter a predetermined operating state correlated with a testing environment, the predetermined operating state being configured to force the selected drive to experience a preemptive failure,
      monitoring the selected drive for any hardware and/or software errors while in the predetermined operating state, and
      in response to detecting one or more hardware and/or software errors, causing the selected drive to fail the preemptive failure test.

2. The method of claim 1, further comprising:
   provisioning sufficient spare storage space in the RAID array to maintain redundancy during the mirroring and testing; and in response to the selected drive failing the preemptive failure testing, removing the selected drive from the RAID array.

3. The method of claim 1, further comprising:
repeating the method for the respective drives in the RAID array.

4. The method of claim 3, further comprising:
in response to any of the drives in the RAID array failing during the mirroring:
aborting the mirroring, and
reverting the spare storage space to normal spare storage space for the RAID array.

5. The method of claim 3, wherein the mirroring of the data from the selected drive to the spare storage space includes:
storing the data mirrored from each of the respective drives in the RAID array, in a different portion of the spare storage space therein.

6. The method of claim 1, wherein a rate of mirroring is tuned to balance a desired test rate of a drive and an impact of the mirroring on performance of the RAID array.

7. The method of claim 1, wherein the RAID array is a traditional RAID (TRAID) array and the spare storage space is a spare physical drive independent of array drive members, wherein redundancy is maintained in the RAID array by adding an extra spare drive during the mirroring and testing.

8. The method of claim 7, wherein the mirroring data includes:
copying data from the selected drive to the spare physical drive; and in response to the testing of the selected drive being successful;
keeping the data of the selected drive on the spare physical drive, and
causing the selected drive to become a new spare drive to which data of a next selected drive is mirrored.

9. The method of claim 1, wherein the RAID array is a distributed RAID (DRAID) array and the spare storage space is a spare capacity spread through the drives in the RAID array.

10. The method of claim 9, wherein redundancy is maintained in the DRAID array by adding an extra spare drive worth of additional capacity during the mirroring and testing.

11. The method of claim 9, wherein the mirroring data includes:
copying data from the selected drive to the spare capacity distributed across the DRAID array; and,
in response to the testing of the selected drive being successful:
integrating the selected drive back into the DRAID array, and
causing the spare capacity to be released for reuse.

12. The method of claim 11, wherein any pending changes are restored and copied back from the spare capacity used during the testing of the selected drive.

13. The method of claim 9, further comprising:
in response to the selected drive failing the preemptive failure test, replace the selected drive in the RAID array with a repaired version of the selected drive or a replacement disk drive, wherein the replacing the selected drive in the RAID array includes:
using the mirrored data in the spare storage space to rebuild the data of the selected drive.

14. A computer system for testing drives in a redundant array of independent disks (RAID) array, comprising:

a processor set;
a set of one or more computer-readable storage media; and
program instructions, collectively stored in the set of one or more storage media, for causing the processor set to perform the following computer operations:
select one of the drives for preemptive testing;
perform a preemptive failure test on the selected drive, by:
causing the selected drive to enter a predetermined operating state correlated with a testing environment, the predetermined operating state being configured to force the selected drive to experience a preemptive failure,
monitoring the selected drive for any hardware and/or software errors while in the predetermined operating state, and
in response to detecting one or more hardware and/or software errors, causing the selected drive to fail the preemptive failure test; and
in response to the selected drive failing the preemptive failure test, replace the selected drive in the RAID array with a repaired version of the selected drive or a replacement disk drive.

15. The system of claim 14, further comprising:
a provisioning component configured to provision sufficient spare storage space to maintain redundancy in the RAID array,
wherein the program instructions are for causing the processor set to further perform the following computer operations:
remove a selected drive from the RAID array in response to the selected drive failing the testing.

16. A computer implemented method (CIM) for use with a RAID array device including a plurality of disk drives, comprising:
selecting one of the plurality of disk drives for preemptive testing;
performing a preemptive failure test on the selected disk drive, by:
causing the selected disk drive to enter a predetermined operating state correlated with a testing environment, the predetermined operating state being configured to force the selected disk drive to experience a preemptive failure,
monitoring the selected disk drive for any hardware and/or software errors while in the predetermined operating state, and
in response to detecting one or more hardware and/or software errors, causing the selected disk drive to fail the preemptive failure test; and
in response to the selected disk drive failing the preemptive failure test, replacing the selected disk drive in the RAID array device with a repaired version of the selected disk drive or a replacement disk drive.

17. The CIM of claim 16 further comprising:
prior to the performance of the preemptive testing, storing a backup copy of data stored on the selected disk drive; and
subsequent to the performance of the preemptive testing, restoring, from the backup copy, the data to the repaired version of the selected disk drive or the replacement disk drive.

18. The CIM of claim 16 wherein the performing the preemptive failure test on the selected disk drive includes:

in response to not detecting any hardware and/or software errors, causing the selected disk drive to exit the predetermined operating state; and in response to the selected disk drive exiting the predetermined operating state, causing the selected disk drive to be power cycled.

\* \* \* \* \*